United States Patent [19]
Araki

[11] Patent Number: 5,280,366
[45] Date of Patent: Jan. 18, 1994

[54] FACSIMILE DEVICE WITH WHICH CONTENT TRANSMITTED AND RECEIVED CAN BE EASILY KNOWN

[75] Inventor: Shigeharu Araki, Nara, Japan

[73] Assignee: Sharp Kabushiki Kaisha, Osaka, Japan

[21] Appl. No.: 710,153

[22] Filed: Jun. 4, 1991

[30] Foreign Application Priority Data

| Jun. 5, 1990 | [JP] | Japan | 2-148011 |
| Jun. 5, 1990 | [JP] | Japan | 2-148012 |
| Jun. 5, 1990 | [JP] | Japan | 2-148013 |
| Jun. 5, 1990 | [JP] | Japan | 2-148014 |
| Jun. 6, 1990 | [JP] | Japan | 2-149631 |

[51] Int. Cl.⁵ .................. H04N 1/387; H04N 1/40
[52] U.S. Cl. ..................... 358/453; 358/460
[58] Field of Search ............ 358/400, 401, 403, 407, 358/434, 435, 436, 442, 443, 444, 450, 453, 474, 476, 460; 379/100

[56] References Cited

U.S. PATENT DOCUMENTS

| 4,007,362 | 2/1977 | Sindermann | 235/151 |
| 4,432,020 | 2/1984 | Onose et al. | 358/434 |
| 4,494,149 | 1/1985 | Furukawa | 358/404 |
| 4,811,111 | 3/1989 | Kurokawa | 358/440 |
| 4,823,193 | 4/1989 | Takahashi | 358/257 |
| 4,827,349 | 5/1989 | Ogata et al. | 358/434 |
| 5,001,572 | 3/1991 | Hashimoto et al. | 358/400 |
| 5,012,353 | 4/1991 | Yoshino et al. | 358/474 |
| 5,068,741 | 11/1991 | Takahashi | 358/296 |
| 5,103,318 | 4/1992 | Takaoka | 358/404 |

FOREIGN PATENT DOCUMENTS

| 0051226 | 10/1980 | European Pat. Off. | G06K 17/00 |
| 2648657 | 6/1990 | France | H04N 1/32 |
| 182272 | 9/1985 | Japan | H04N 1/21 |
| 1-150973 | 6/1989 | Japan | H04N 1/21 |

*Primary Examiner*—Edward L. Coles, Sr.
*Assistant Examiner*—Jerome Grant, II

[57] ABSTRACT

A facsimile device stores communication administration information every time image information is transmitted and received. The facsimile device stores information in a region including a title of an image to be transmitted and information of a transmitting source which transmitted the received image information in the image information to be transmitted and received. The transmitting source information and the title of the transmitted original, which are stored, are printed out by a printer as a daily report administration list along with the communication administration information. As a result, the transmitting source information and the title of the transmitted original can be easily confirmed.

21 Claims, 13 Drawing Sheets

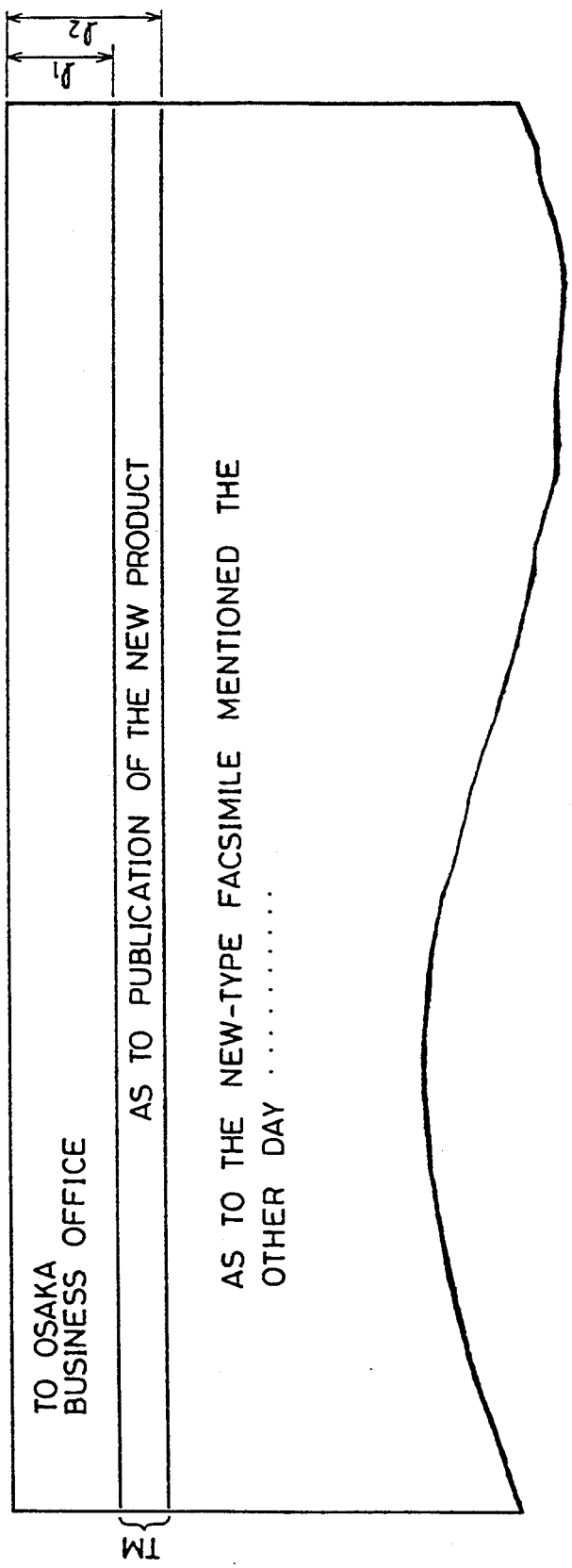

FIG. 7A  PRIOR ART

TABLE OF COMMUNICATION RECORD (TRANSMISSION)
OCTOBER 9, 1989 (MON.) 13:30

| NUMBER | DATE | TIME | NAME OF RECEIVING OFFICE | REQUIRED TIME PERIOD | NUMBER OF PAGES | COMMUNICATION RESULT | SECTION |
|---|---|---|---|---|---|---|---|
| 01 | 09/14 | 11:00 | OSAKA BUSSINESS OFFICE | 00.05.10 | 010 | OK | |
| 02 | 09/15 | 12:00 | HEAD OFFICE | 00.01.10 | 002 | OK 11 02 | |
| 03 | 09/20 | 15:25 | 0612312345 | 00.00.20 | 001 | OK | |
| 04 | 10/01 | 13:08 | KYOTO BRANCH | 00.00.15 | 001 | OK | |
| 05 | 10/08 | 10:00 | 0151234567 | 00.00.20 | 001 | OK | |
| 06 | 10/03 | 08:55 | NARA BUSSINESS OFFICE | 00.01.15 | 003 | OK | |

FIG. 7B PRIOR ART

TABLE OF COMMUNICATION RECORD (RECEPTION)

OCTOBER 9, 1989 (MON.) 13:31

| NUMBER | DATE | TIME | NAME OF TRANSMITTING OFFICE | REQUIRED TIME | NUMBER OF PAGES | COMMUNICATION RESULT | SECTION |
|---|---|---|---|---|---|---|---|
| 01 | 09/12 | 12:00 | 0451234567 | 00.00.15 | 001 | OK | |
| 02 | 09/14 | 15:34 | HEAD OFFICE | 00.00.45 | 002 | OK | |
| 03 | 10/01 | 20:10 | 0612312345 | 00.00.20 | 001 | OK COMMUNICATION REQUEST RECEIVED | |
| 04 | 10/02 | 23:00 | 0111234567 | 00.01.10 | 003 | OK | |
| 05 | 10/07 | 08:55 | 0623423456 | 00.00.47 | 003 | COMMUNICATION ERROR | |
| 06 | 10/08 | 12:00 | KYOTO BRANCH | 00.00.17 | 001 | OK | |

FIG. 8A

TABLE OF COMMUNICATION RECORD (TRANSMISSION)
OCTOBER 9, 1989 (MON.) 13:30

| 01 | AS TO PUBLICATION OF THE NEW PRODUCT |
| 02 | REPORT ON THE PRESENT CONDITION WITH THE INTRODUCTION OF THE NEW SYSTEM |
| 03 | AS TO AB-100 TYPE CABLE |
| 04 | AS TO A REQUEST FOR MODIFICATION OF SALES ROUTE |
| 05 | AS TO MODIFICATION OF XX-123 DESIGN |
| 06 | AS TO PUBLICATION OF THE NEW PRODUCT |

FIG. 8B

TABLE OF COMMUNICATION RECORD (RECEPTION)

OCTOBER 9, 1989 (MON.) 13:31

| 01 | 1989/09/12 TUE. AM 12:00 0451234567 | P.1 |
| 02 | SEPTEMBER 14, 1989 (THURS.) 15:34 HEAD OFFICE | 1/2 |
| 03 | 89.10.01 SUN. 20:10 0612312345 P1 | |
| 04 | 1989. 10. 2 MON. PM 11:00 0111234567 | 1/3 |
| 05 | OCTOBER 7, 1989 (SAT.) 8:55 0623423456 | 1 |
| 06 | OCTOBER 8, 1989 (SUN.) 12:00 KYOTO BRANCH 1/1 | |

FIG. 9A

TABLE OF COMMUNICATION RECORD (TRANSMISSION)
OCTOBER 9, 1989 (MON.) 13:30

| | | | | | | | |
|---|---|---|---|---|---|---|---|
| 01 | 09/14 | 11:00 | OSAKA BUSSINESS OFFICE | 00.05.10 | 010 | OK | |
| | AS TO PUBLICATION OF THE NEW PRODUCT | | | | | | |
| 02 | 09/15 | 12:00 | HEAD OFFICE | 00.01.10 | 002 | OK | 11 02 |
| | REPORT ON THE PRESENT CONDITION WITH THE INTRODUCTION OF THE NEW SYSTEM | | | | | | |
| 03 | 09/20 | 15:25 | 0612312345 | 00.00.20 | 001 | OK | |
| | AS TO AB-100 TYPE CABLE | | | | | | |
| 04 | 10/01 | 13:08 | KYOTO OFFICE | 00.00.15 | 001 | OK | |
| | AS TO A REQUEST FOR MODIFICATION OF SALES ROUTE | | | | | | |
| 05 | 10/08 | 10:00 | 0451234567 | 00.00.20 | 001 | OK | |
| | AS TO MODIFICATION OF XX-123 DESIG | | | | | | |
| 06 | 10/09 | 08:55 | NARA BUSSINESS OFFICE | 00.01.15 | 003 | OK | |
| | AS TO POBLICATION OF THE NEW PRODUCT | | | | | | |

FIG. 9B

TABLE OF COMMUNICATION RECORD (RECEPTION)
OCTOBER 9, 1989 (MON.) 13:31

| 01 | 09/12 | 12:00 | 0451234567 | 00.00.15 | 001 | OK | P.1 |
| | 1989/09/12 TUE AM 12:00 0451234567 | | | | | | |
| 02 | 09/14 | 15:34 | HEAD OFFICE | 00.00.45 | 002 | OK | 1/2 |
| | SEPTEMBER 14, 1989 (THURS) 15:34 HEAD OFFICE | | | | | | |
| 03 | 10/01 | 20:10 | 0612312345 | 00.00.20 | 001 | COMMUNICATION REQUEST RECEIVED | P1 |
| | 89.10.01 SUN 20:10 0612312345 | | | | | | |
| 04 | 10/02 | 23:00 | 0111234567 | 00.01.10 | 003 | OK | 1/3 |
| | 1989.10.2 MON PM 11:00 0111234567 | | | | | | |
| 05 | 10/07 | 08:55 | 0623423456 | 00.00.47 | 003 | COMMUNICATION ERROR | 1 |
| | OCTOBER 7, 1989 (SAT.) 8:55 0623423456 | | | | | | |
| 06 | 10/08 | 12:00 | KYOTO BRANCH | 00.00.17 | 001 | OK | 1/1 |
| | OCTOBER 8, 1989 (SUN.) 12:00 KYOTO BRANCH | | | | | | |

FACSIMILE DEVICE WITH WHICH CONTENT TRANSMITTED AND RECEIVED CAN BE EASILY KNOWN

BACKGROUND OF THE INVENTION

1. Field of the Invention

The invention relates generally to facsimile devices for transmitting and receiving image information with a facsimile device at an opposite end, and more particularly, relates to facsimile devices with which a summary of contents transmitted and received can be easily known.

2. Description of the Background Art

In a conventional facsimile device, the date, the time of the transmitting and receiving operation, the name of the transmitting or receiving office, the time period required for the transmitting and receiving operation, the number of pages, the communication result and so on are stored as communication administration information so that an operator can later confirm communication record of the facsimile device. The contents thereof are sequentially printed as a daily report administration list in time sequence in each communication unit, for example, as shown in FIGS. 7 A and 7B.

In the conventional facsimile device, however, though the communication administration information outputted as the daily report administration can be confirmed by the operator after the transmitting or receiving operation, it is impossible to confirm the contents of image to be transmitted or received (for example, a summary of the contents and a title of an original to be transmitted and transmitting source information from a facsimile at the transmitting office which is added as an image to the image to be received. There is a problem that unless the operator keeps the transmitted original or the received image and he himself retains and administers when the original or the image was transmitted or received, the contents thereof cannot be confirmed.

SUMMARY OF THE INVENTION

Therefore, an object of the present invention is, in a facsimile device, to easily confirm transmitting source information of a facsimile device of a transmitting office.

Another object of the invention is to easily confirm, in a facsimile device, a summary of an image transmitted from a transmitting office.

Another object of the invention is to enable an operator to easily confirm the contents of a transmitted original in a facsimile device.

Still another object of the invention is to enable an operator to easily confirm a title of a transmitted original in a facsimile device.

Still another object of the invention is to enable an operator to confirm the contents of an image transmitted or received as a daily report administration list along with communication administration information in a facsimile device.

Still another object of the invention is to enable an operator to confirm the contents of a transmitted original as a daily report list of a facsimile device along with transmission administration information in a daily report administration device of the facsimile device.

Yet another object of the invention is to enable an operator to confirm transmission administration information of a facsimile device at a transmitting office transmitted with image information as transmitting source information as a daily report list of the facsimile itself along with receive administration information in a daily report administration device of the facsimile device.

The objects of the present invention above are achieved by a facsimile device including elements below. That is, a facsimile device for receiving image information transmitted from a facsimile device at a transmitting office and reproducing the received image information in accordance with the present invention includes a region setting device for setting any region of image information to be received, a memory for storing the information in the set region every time the image information is received, and a record device for recording the image information stored in the memory in the order in which it is stored in the memory.

The facsimile device according to the present invention includes the above-mentioned elements, so that any region of the image information to be received is stored and reproduced. As a result, a summary of the received image can be easily known in the facsimile device. Preferably, a region set by the region setting device is a portion of transmitting source information received from a facsimile device at a transmitting office as image information. The transmitting source information is stored and reproduced, so that the transmitting source information can be easily confirmed in the facsimile device.

In another aspect of the invention, a facsimile device for transmitting image information obtained by scanning an original to a facsimile device at a receiving office includes a setting device for setting any region of image information to be scanned, a memory for storing the set portion of the scanned image information every time the image information is transmitted, and record means for recording the image information stored in the memory in the order in which it is stored in the memory.

In the facsimile device, any region of the original to be transmitted is set and stored and the stored portion is reproduced. As a result, in the facsimile device, the operator can easily confirm the contents of the transmitted original.

In another aspect of the invention, a daily report administration device of a facsimile device for storing communication administration information and for recording the communication administration information as a daily report administration list every time image information is transmitted or received with a facsimile device at an opposite end includes a region setting device for setting any region of the image information to be transmitted and received, a memory for storing the image information of the set region in connection with the communication administration information, and a recording/reproducing mode select device for selecting one of a first mode in which the communication administration information is only recorded as a daily report administration list, a second mode in which the image information stored in the memory is recorded along with the communication administration information as a daily report administration list, and a third mode in which the image information stored in the memory is recorded in the order in which it is stored in the memory.

In the daily report administration device of the facsimile device, the operator can select any of recording of the communication administration information only, recording of a desired region of the image transmitted and received along with the communication administration information, and recording of the image information transmitted or received only. As a result, in the daily report administration device of the facsimile device, the operator can also confirm the contents of the image transmitted and received along with the communication administration information as a daily report administration list.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are explanatory diagrams showing one example of an original image and a received image, respectively.

FIG. 7A is a list of transmission administration information only.

FIG. 7B is a list of receive administration information only.

FIGS. 8A and 8B are explanatory diagrams showing one example of a list of set region image to be transmitted only and a set region image to be received only, respectively.

FIGS. 9A and 9B are explanatory diagrams showing one example of a list of transmission administration information and a region image to be transmitted and a list of receive administration information and a region image to be received, respectively.

DESCRIPTION OF THE PREFERRED EMBODIMENTS

A detailed description will be made of a facsimile device according to the present invention in the following with reference to the drawings.

Figure 1:
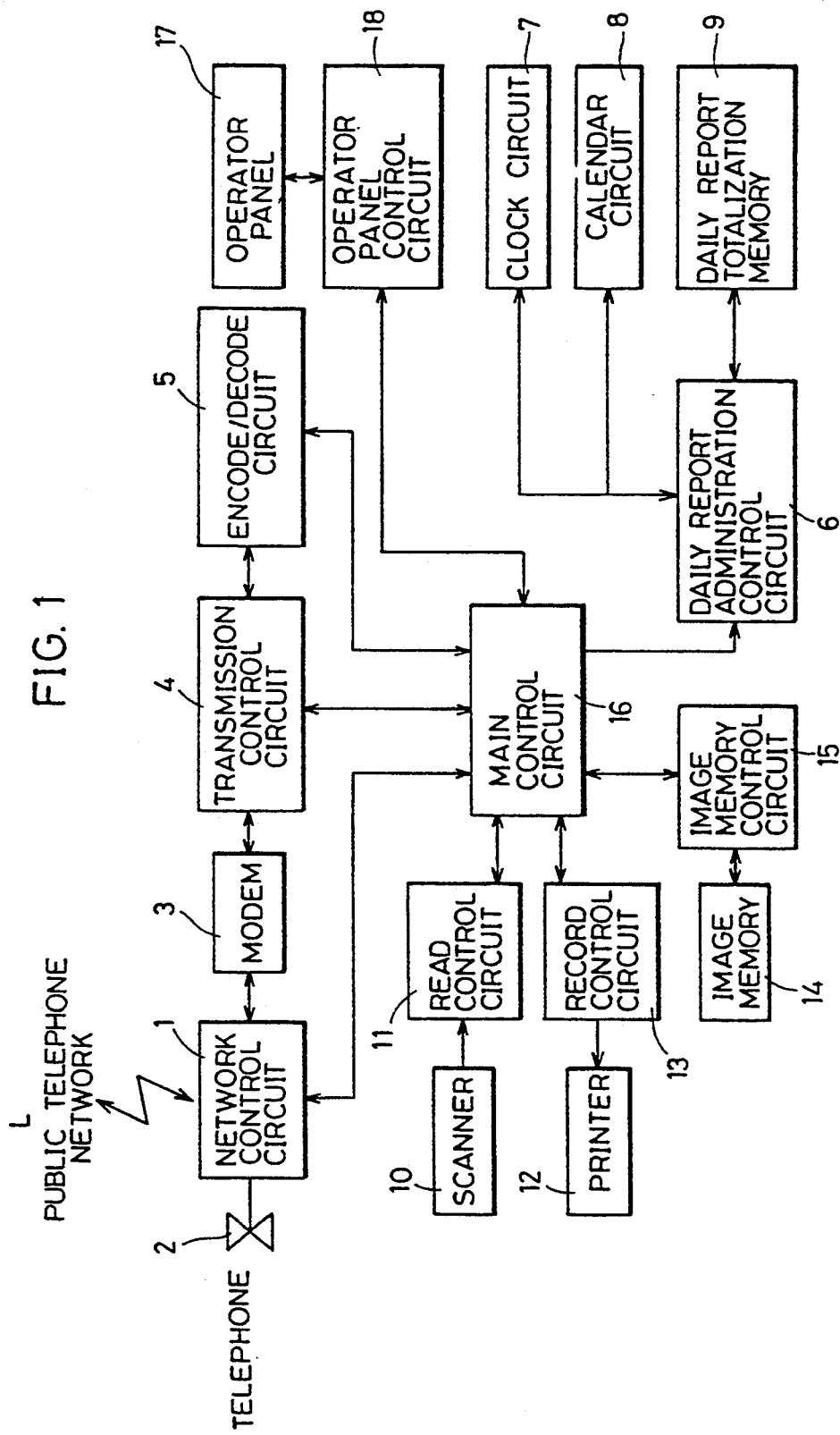
FIG. 1 is a block diagram showing one embodiment of a facsimile device according to the present invention.

Referring to FIG. 1, a network control circuit 1 generally known as an NCU is connected to a public telephone network L. A telephone set for conversation 2 is connected to the network control circuit 1 and calls up a receiving office by dialing operation. A modem 3 modulates a digital compressed signal of image information and so on generated in the facsimile device into an analog signal to transmit it to a facsimile device of the receiving office, or receives an analog signal transmitted from the facsimile of the transmitting office to demodulate it to a digital compressed signal. A transmission control circuit 4 is connected to the modem 3, for controlling signal transmission with a facsimile device of the transmitting office or the receiving office. An encode/decode circuit 5 is connected to the transmission control circuit 4, for encoding a digital bit string of image information to be transmitted into a digital compressed signal or decoding the digital compressed signal demodulated by the modem 3 to a digital bit string of image information. A daily report administration control circuit 6 for administering transmission/receive administration information generated in each transmission or communication (for example, the date, the time, the name of the transmitting or receiving office, the required time, the number of pages, the result of communication and so on) is connected to a clock circuit 7 for generating clock information required for the daily report administration and a calendar circuit 8 for generating calendar information. The transmission/receive administration information generated with each communication is controlled by the daily report administration control circuit 6 and stored in a daily report totalization memory 9 in time sequence. A scanner 10 for reading an original image to be transmitted is driven and controlled by a read control circuit 11. A printer 12 is controlled by a record control circuit 13 and records the received image information and the transmission/receive administration information administered by the daily report administration control circuit 6. The received image or, part of or all of the image information read by the scanner 10 is stored in an image memory 14. An area and an address where the image information is to be stored are controlled by an image memory control circuit 15 in connection with the transmission/receive administration information administered at the daily report administration control circuit 6. A main control circuit 16 exercises general control over each of these control circuits. An operation command and an information input to the control circuit 16 is supplied by an operator panel 17 through an operator panel control circuit 18.

A specific operation of a facsimile device according to the present invention will now be described with respect to a process of setting a region to be stored, a transmission process, a receive process and a daily report printing process, respectively.

I. Process of setting a region to be stored

A description will now be made below of manners in which a region to be stored of the image is set. There are two setting manners described below.

(1) First manner

In this manner, numerical value keys are provided on the operator panel 17 for inputting the distances l1, l2, and these distances are set for each transmission and reception, wherein l1 represents a distance from a position where the scanner 10 starts reading to a position where storing of a region TM to be stored of the image to be transmitted is started, and l2 represents a distance from a position where the scanner 10 starts reading to a position where storing of the region TM is finished.

In this case, there are provided function keys, i.e., a region setting mode key, a transmission image/reception image selection key, an l1/l2 selection key (which is not required if it is fixed that l2 should be set after setting l1).

(i) Transmission mode

A region to be stored of an original image is set at the time of setting the original, which will be described later in FIG. 4.

Firstly, the region setting mode key is operated and then (it is supposed that the transmission is selected by not operating the transmission image/reception image selection key) a value of a distance corresponding to l1 (the distance from the top of the original to the region TM) is inputted by the numerical value key (for example in mm). After that, the l1 key is operated, so that setting of the value of l1 is completed.

This $l1$ is held in a memory MTM 11. Subsequently, a distance value corresponding to $l2$ (a distance from the top of the original to the rear end of the region TM) is inputted by the numerical value key. Setting of the value of $l2$ is completed by operating the $l2$ key. The value of $l2$ is held in a memory MTM 21.

(ii) Receiving mode

In this case, the operation is carried out in a similar way as in the case of the transmission mode. In the case of the receiving mode, the transmission image/reception image selection key is operated subsequently to the operation of region setting mode key and a region of the image to be received is set.

$l1$ is held in a memory MRM 11 and $l2$ is held in a memory MRM 21. These values are reset every time transmission/reception is completed.

(2) Second manner

In this manner, the above-mentioned region is fixed in advance.

In this manner, a function key of a lock mode key is provided in addition to each key stated above. In this case, before the operation of (1) above, this lock mode key is operated, so that the values $l1$ and $l2$ are, unless they are reset, held in memories MTM 10 (for the value of transmission $l1$), MTM 20 (for the value of transmission $l2$), MRM 10 (for the value of reception $l1$), MRM 20 (for the value reception $l2$) which are not reset, respectively.

A manner in which these memories MTM 10, MTM 20, MRM 10, MRM 20 are used will be described later. Priority is given to the first manner (1) when the first manner is set while priority is given to the second manner (2) when the first manner is not set.

Figure 2:
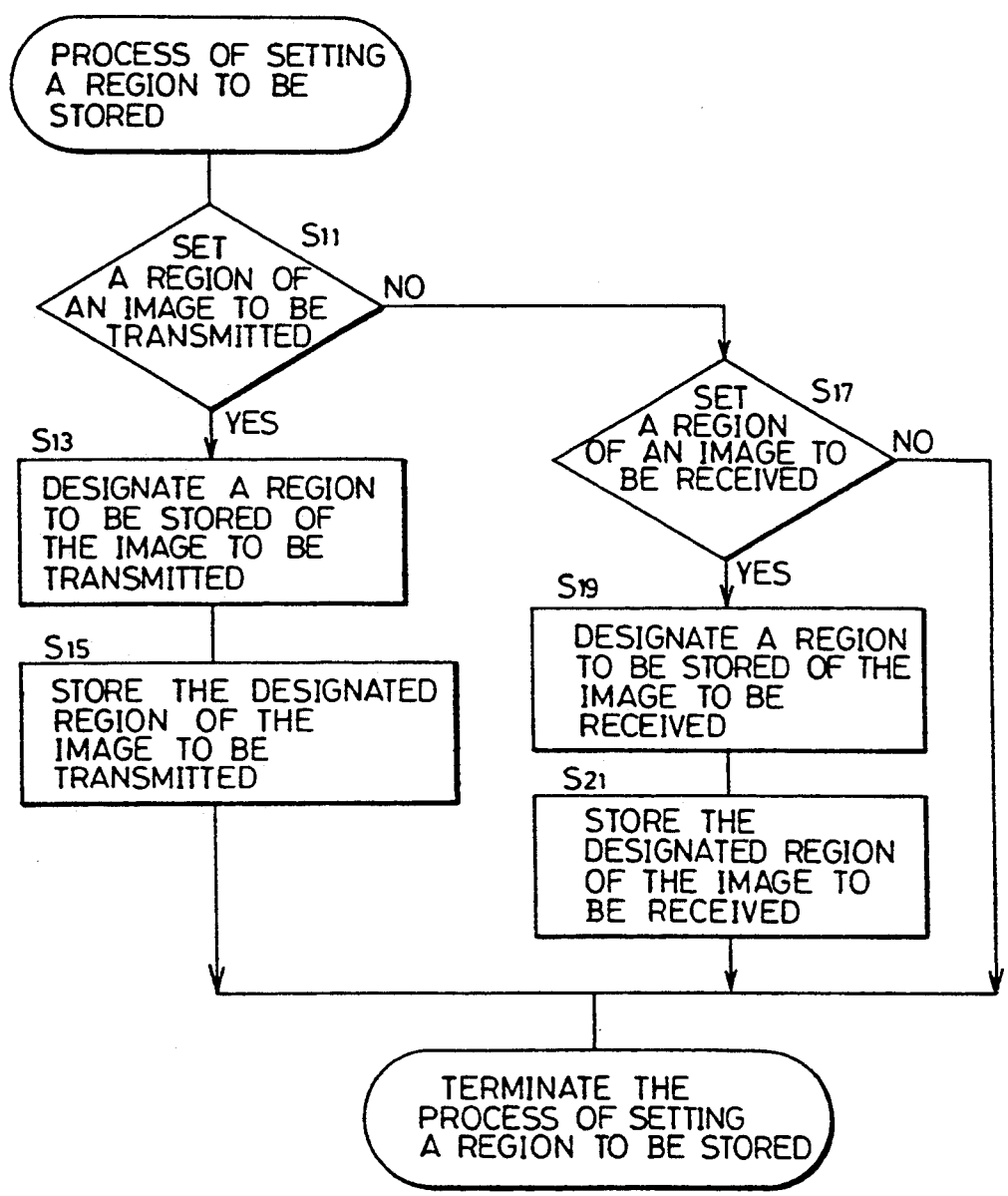
FIG. 2 is a flow chart of a process of setting a region to be stored.

Referring to FIG. 2, a process of setting a region to be stored will now be described, in which an original image to be transmitted and a region of the received image to be stored are preset before facsimile communication.

An operator selects between setting a region to be stored of the image to be transmitted (step S11, "step" will be hereinafter referred to as "S") and setting a region to be stored of the image to be received (S17) after he selected a process of setting a region to be stored by the operator panel 17. If the operator selects setting of a region to be stored of the image to be transmitted (S13) he sets a region TM of the image to be transmitted which is to be stored shown in FIG. 3A. A distance $l_1$ from a position where the scanner 10 starts reading to a position where storing is started in the region TM and a distance $l_2$ from the position where the scanner 10 starts reading to a position where storing is ended in the region TM are inputted in numerical value. When the respective distances $l_1$, $l_2$ are inputted, the main control circuit 16 notifies the image memory control circuit 15 that the region TM to be stored of the image to be transmitted has been set. The image memory control circuit 15 stores the distances $l_1$, $l_2$ as position information of the region TM to be stored in preparation for a transmission process. It is preferable that a portion of a name of the case or a title such as "as to publication of the new product" as in FIG. 3A is set as the region TM so that the operator would easily confirm the contents of the transmitted original later. If a format of an original to be transmitted is fixed (for example, manuscript papers on which predetermined ruled lines are printed and the like), it may save the trouble of setting the position information $l_1$, $l_2$ of the region TM every time transmission is effected.

Figure 3B:
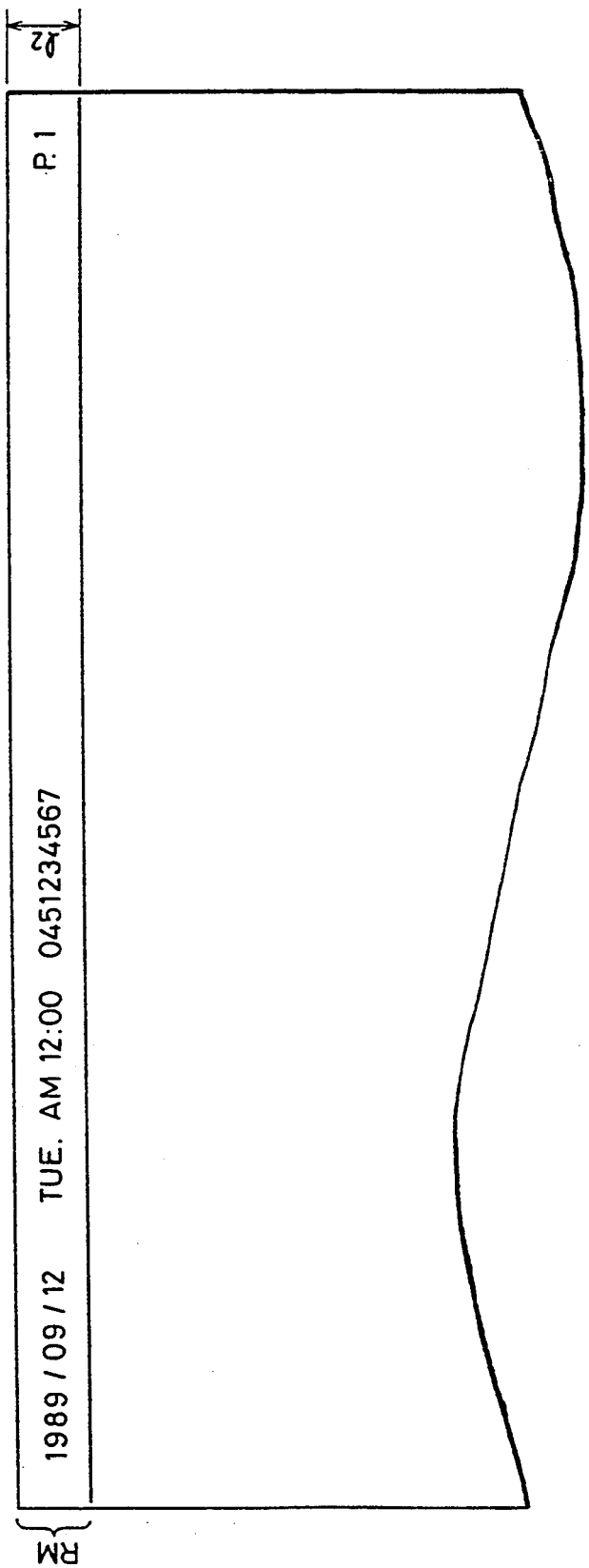

If the operator selects the process of setting a region to be stored of the image to be received (YES in S17, S19), he set a region RM to be stored of the image to be received shown in FIG. 3B. A distance $l_1$ from a position where the printer 12 starts recording and reproducing to a position of the region RM where storing is started (not shown since $l_1 = 0$ in this embodiment) and a distance $l_2$ from the position where the printer 12 starts recording and reproducing to a position of the region RM where storing is ended are inputted in numerical value. When the distances $l_1$, $l_2$ are inputted, the main control circuit 16 notifies the image memory control circuit 15 that the region TM to be stored of the image to be received has been set. The image memory control circuit 15 stores the distances $l_1$, $l_2$ as position information of the region RM to be stored in preparation for a receive process (S21). It is preferable that transmitting source information (for example, the transmission date, the transmission time, the transmitter, pages and the like) which is normally transmitted at the head portion of an original image as an image should be set as the region RM as shown in FIG. 3B so that the operator could later easily confirm when and from whom it was transmitted.

II. Transmission process

Figure 4:
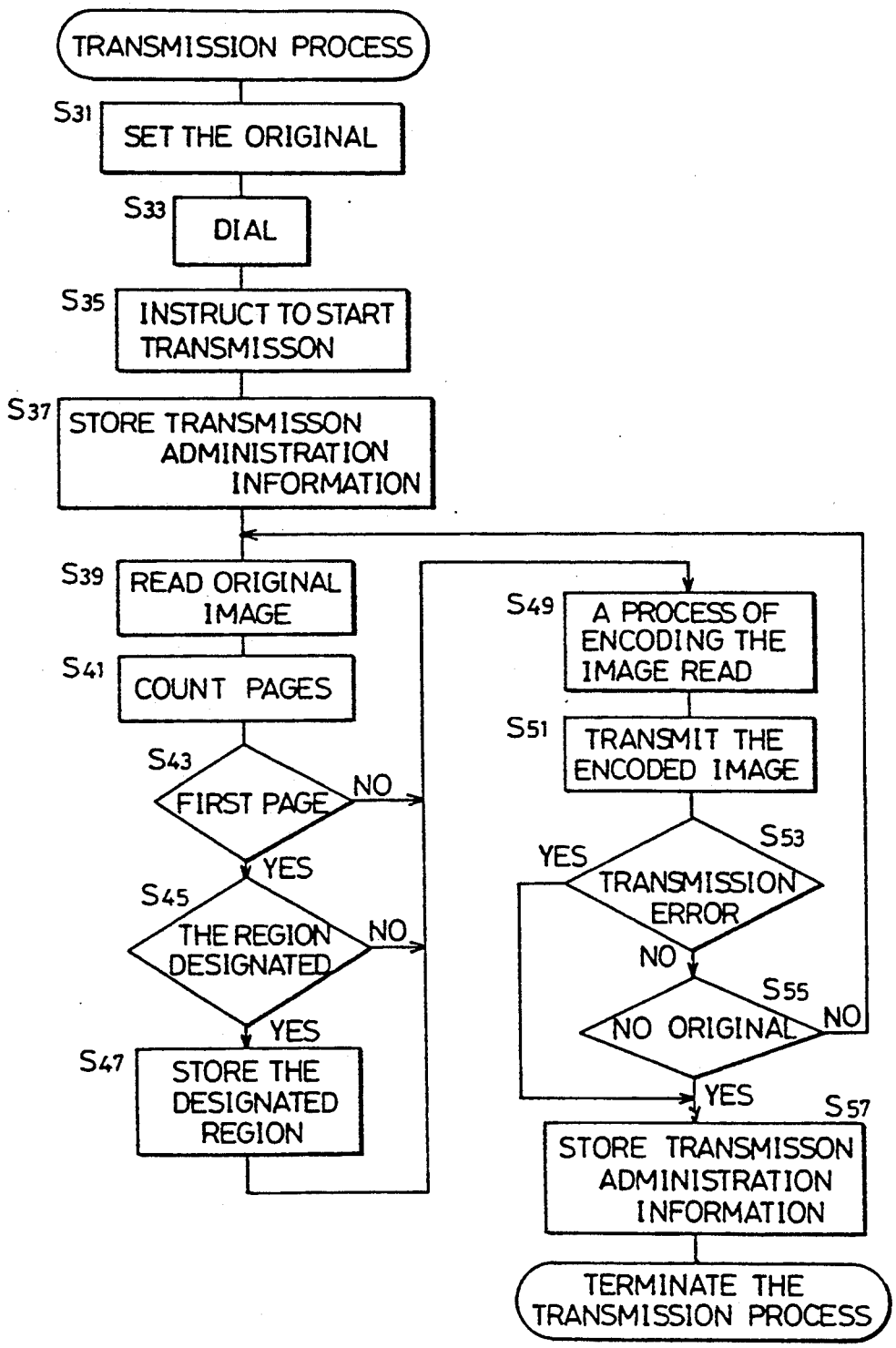
FIG. 4 is a flow chart of a transmission process.

Referring to FIG. 4, a description will be made of a transmission process in which an image of an original is read and facsimile-transmitted to a facsimile device of a predetermined receiving office.

The operator sets an original to be transmitted on the scanner 10 (S31), and calls up a predetermined receiving office by dialing the telephone 2 (S33). When the lines are connected and there is a facsimile response from the predetermined receiving office, the operator gives instructions to start transmission by the operator panel 17 (S35). When the instructions to start transmission is given, the main control circuit 16 directs the daily report administration control circuit 6 to prepare transmission administration information. The daily report administration control circuit 6 prepares transmission administration information (including for example, the transmission date, the transmission time, the name of the receiving office and so on) based on the clock information from the clock circuit 7 and the calendar information from the calendar circuit 8 and stores the same in the daily report totalization memory 9 in time sequence (S37). Then, the main control circuit 16 directs the read control circuit 11 to start reading the original (S39). The read control circuit 11 counts the number of original pages and prepares information on pages as well as reads the image to be transmitted (S41). When the original read is the first page (YES in S43), the read control circuit 11 notifies the main control circuit 16 of it. The main control circuit 16 receives the notification and directs the encode/decode circuit 5 to encode the read image to be transmitted as well as directs the image memory control circuit 15 to store the image to be transmitted. The image memory control circuit 15 receives the instructions to store the image from the main control circuit, makes a determination as to whether the region TM to be stored in advance has been set (S45), and, if it has been set, starts storing information of the predetermined region TM of the image to be transmitted on the first page shown in FIG. 3A (S47).

A description will now be made of a manner in which the region TM is detected. In the step of reading the original image indicated by S39 of FIG. 4, reading of the image to be transmitted is started after finishing a procedure to be performed before image transmission such as connection to the network, a matching process of transmission procedures and the like in the facsimile device. At this time, the step of reading the original image is carried out on a resolution basis determined in the procedure before image transmission (1 line, for example, 1/7.7 mm). When reading of 1 line is completed, the original is transported simultaneously with an encoding process of the read image, and furthermore, a counter CNT for counting the number of read lines is updated.

The counted value of the counter CNT1 is converted into millimeter according to the resolution above and a check is made to see if it is between the value of l1 stated above (MTM 10 or MTM 11) and the value of l2 (MTM 20 or MTM 21). Whether the distance value is set in the memories MTM 11/MTM 21 or not determines which memories, the memories MTM 10/MTM 20 or the memories MTM 11/MTM 21, are used.

The process above is repeated and if the value of the counter CNT coincides with the value of the memory MTM, the image is stored in a predetermined position of a transmission image storing area of the daily report memory 9 simultaneously with the image transmission (S49). The encode/decode circuit 5 starts encoding the image to be transmitted, constituted by a digital bit string, to a digital compressed signal by the encode instructions from the main control circuit 16.

If the original read is the second or later page (NO in S43), or if the region TM has not been set in advance (NO in S45), the read image to be transmitted is not stored but is sequentially encoded to a digital compressed signal by the encode/decode circuit 5 with start of reading operation (S49). The image to be transmitted which has been encoded to the digital compressed signals is modulated to analog signals at the modem 3 under control of the transmission control circuit 4, sent to the public telephone network L through the network control circuit 1 and transmitted to the facsimile device of the predetermined receiving office (S51) The same is true of a case in which the original to be transmitted has a plurality of pages.

If an error occurs due to some reasons during transmission (YES in S51), the transmission control circuit 4 stops transmission at that point and notifies the main control circuit 16 of the occurrence of the transmission error. The main control circuit 16 receives the notification, directs the daily report administration control circuit 6 to prepare transmission administration information that the transmission error has occurred and directs the record control circuit 13 to record the transmission result that the transmission error has occurred. The daily report administration control circuit 6 receives the instructions to create transmission administration information from the main control circuit to store transmission administration information (including for example, the number of pages transmitted, the required time period, the result of transmission and so on) in the daily report totalization memory 9 in connection with the transmission administration information stored previously (S57). The record control circuit 13 receives the instructions to record the occurrence of the transmission error from the main control circuit, drives the printer 12 and instantly records the transmission result that the transmission error has occurred to terminate the transmission process.

If the transmission of the image to be transmitted to the receiving office is terminated without occurrence of a transmission error or the like (NO in S53), only transmission administration information (for example, the number of pages transmitted, the required time period, the transmission result and so on) is stored in the daily report totalization memory 9 by the daily report administration control circuit 6 (S55, S57) to terminate the series of the transmission process.

III. Reception process

Figure 5:
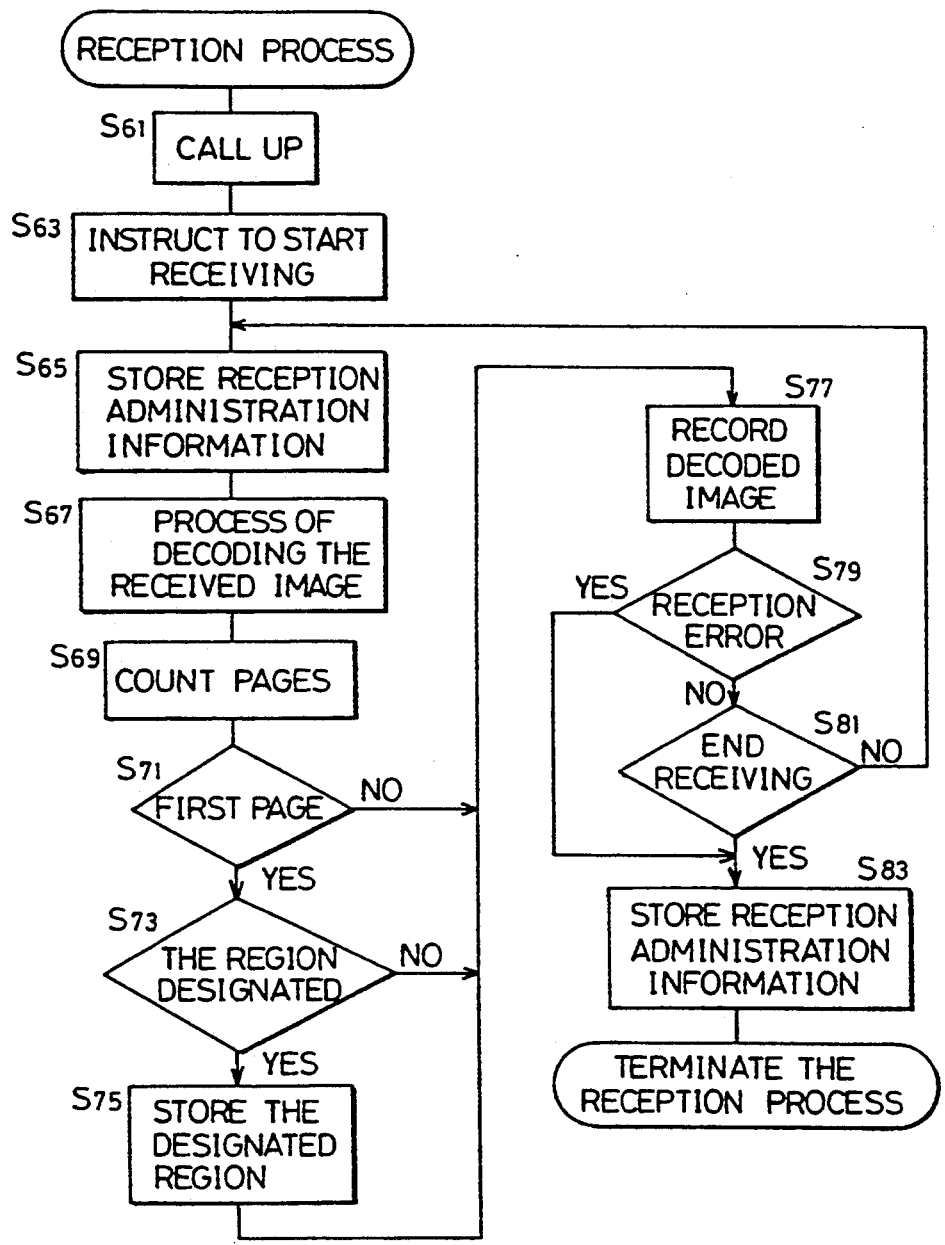
FIG. 5 is a flow chart of a receive process.

Referring now to FIG. 5, a description will be made of a reception process in which an original image transmitted from a facsimile device of a transmitting office is facsimile-received.

When the operator responds by telephone to a calling tone from the telephone of the transmitting office (S61) to confirm that the message is transmitted through the facsimile device, he instructs the main control circuit to start receiving through the operator panel 17 (S63) When the instructions to start receiving is given, the main control circuit 16 instructs the transmission control circuit 4 to control a facsimile signal transmitted and instructs the daily report administration control circuit 6 to prepare reception administration information. The transmission control circuit 4, with the instructions of the main control circuit 16, demodulates the analog facsimile signal transmitted from the transmitting office to a digital compressed signal by the modem 3. The daily report administration control circuit 6 receives the instructions to prepare reception administration information from the main control circuit 16, prepares reception administration information (including for example, the receive date, the receive time, the name of the receiving office and so on) based on the clock information from the clock circuit 7 and the calendar information from the calendar circuit 8 and stores the same in the daily report totalization memory 9 in time sequence (S65). Then, the main control circuit 16 instructs the encode/decode circuit 5 to decode the demodulated digital compressed signal. The encode/decode circuit 5 starts decoding the received image demodulated to the digital compressed signal into a digital bit string (S67). When decoding of the received image is started, the main control circuit 16 instructs the record control circuit 13 to effect recording and reproduction. The record control circuit 13 drives the printer 12 to start recording and reproducing of the received image decoded to the digital bit string. The record control circuit 13 counts the number of pages of the original received and creates page information (S69) as well as records and reproduces the received image and, if the original received is the first page (YES in S71), notifies the main control circuit 16 of it. The main control circuit 16 receives the notification and instructs the image memory control circuit 15 to store the received image. The image memory control circuit 15 receives the instructions to store the image from the main control circuit and makes a determination as to whether the region RM to be stored in advance has been set (S73). If it has been set, it starts storing information in the predetermined region RM of the received image on the first page shown in FIG. 3B (S75).

A manner in which the region RM is detected will now be described. In the step of decoding the received image shown in S67 of FIG. 5, the number of image lines received is counted using the counter CNT in accordance with the above-mentioned resolution every time the image is received simultaneously with recording and reproduction on recording paper in the image transmission procedure similarly to the manner stated above in which the region TM is detected. Furthermore, a check is made to see if the counted value is between the value of 11 above (the memory MRM 10 or MRM 11) and the value of 12 (MRM 20 or MRM 21) in receiving. When these values coincide with each other, the image is stored in a predetermined position of a reception image storing area of the daily report memory 9 (S75).

If the original received is the second or later page (NO in S71), or if the region RM has not been previously set (NO in S73), the printer 12 is driven by the record control circuit 18 and recording and reproduction is effected without the received image being stored. The same is true of a case in which the original received includes a plurality of pages.

If an error occurs due to some reasons during receiving (YES in S79), the transmission control circuit 4 stops receiving at that point and notifies the main control circuit 16 of the occurrence of the reception error. The main control circuit 16 receives the notification and instructs the record control circuit 13 to record the reception result that the reception error has occurred as well as instructs the daily report administration control circuit 6 to create reception administration information that the reception error has occurred. The daily report administration control circuit 6 receives the instructions of the main control circuit to prepare the reception administration information and stores reception administration information (including for example, the number of pages received, the required time period, the reception result and so on) in the daily report totalization memory 9 in connection with the reception administration information stored previously (S83). The record control circuit 13 receives the instructions to record the occurrence of the reception error from the main control circuit to drive the printer 12, instantly record the reception result that the reception error has occurred and terminate the reception process.

If facsimile-receiving from the transmitting office is terminated without occurrence of a reception error and the like (NO in S79), storing of reception administration information (including for example, the number of pages received, the required time period, the reception results and so on) in the daily report totalization memory 9 is only effected by the daily report administration control circuit 6 to terminate the series of the reception process (S81, S83).

IV. Daily report printing process

Figure 6:
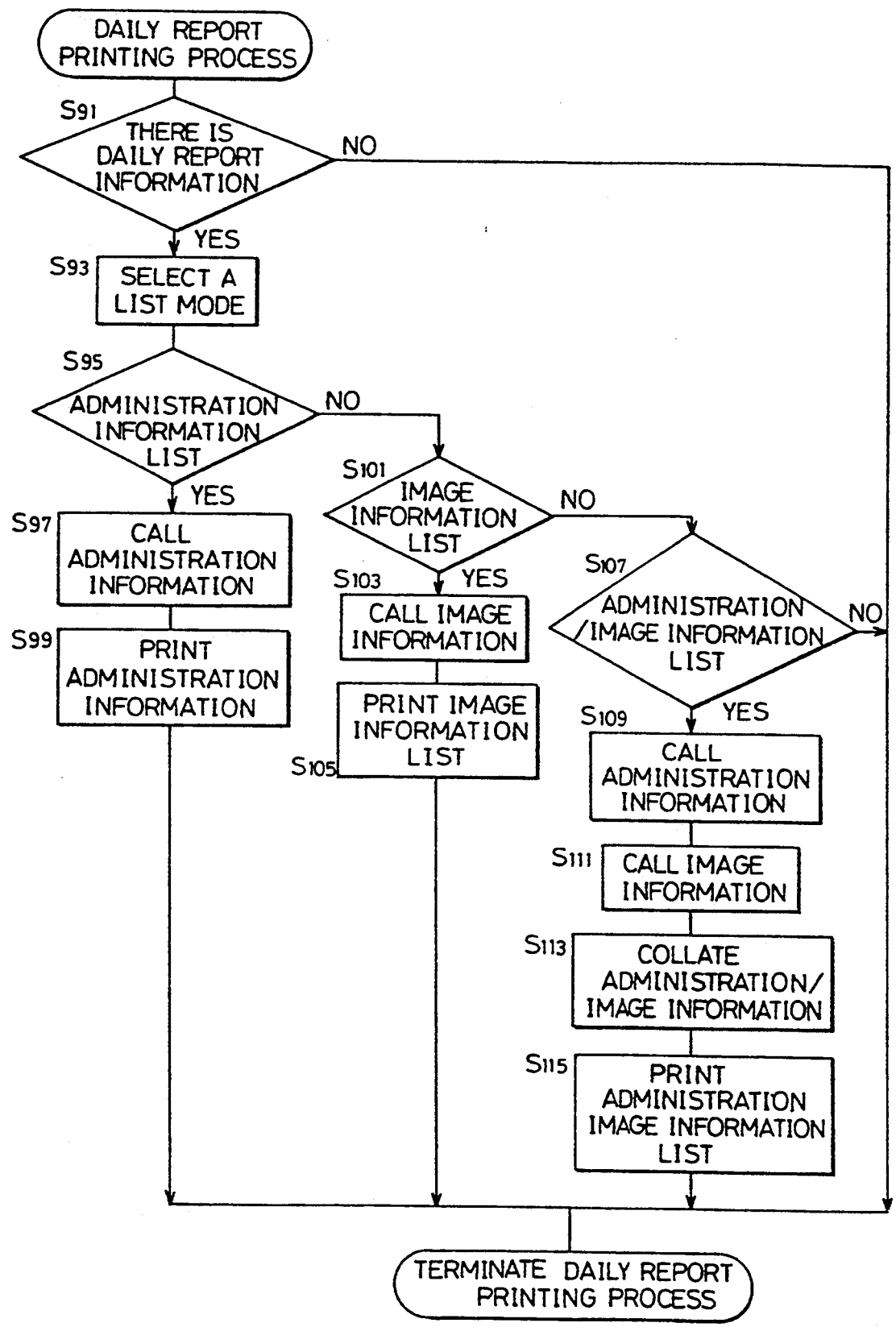
FIG. 6 is a flow chart of a daily report printing process.

Referring to FIG. 6, a description will now be made of a daily report printing process for list-printing the daily report administration information prepared and stored by the transmission process and the reception process at the direction and request of the operator.

The operator selects a daily report printing process in the facsimile device with the operator panel 17 in order to confirm the transmission and reception results of the facsimile communication. The main control circuit 16 instructs the daily report administration control circuit 6 to call back the administration information of the transmission and reception operation stored in time sequence and instructs the image memory control circuit 15 to call back the image information of the transmitted image region TM and the received image region RM which are stored in time sequence. At this time, if none of the daily report information of the transmission and reception administration information and the image information of transmitted and received the image regions is stored (NO in S91), the daily report printing process is terminated and the operator is given an indication that there is no daily report information stored, using for example display means and the like (not shown).

If daily report information is stored, the operator selects a list mode (S93). There are a list mode in which list-printing of the transmission and reception administration information is only effected as in FIGS. 7A, 7B (administration information list), a list mode in which list-printing of the image of the set region to be transmitted and received is only effected as in FIGS. 8A, 8B (image information list), and a list mode in which list-printing of both of the transmission and reception administration information and the image of the set region image is effected as in FIGS. 9A, 9B (administration-/image information list).

If the administration information list is selected (YES in S95), the transmission and reception administration information stored in the daily report totalization memory 9 in time sequence with each 15 communication (for example, the transmission and reception date, the time, the name of the transmitting or receiving office, the required time period, the number of pages, the communication result and so on) is called back by the daily report administration control circuit 6 (S97). The printer 12 is controlled by the record control circuit 13 and a list edited into a predetermined list form such as in FIGS. 7A, 7B is printed out (S99) If the image information list is selected (YES in S101), the image information of the transmitted and received image regions TM and RM stored in the image memory 14 in time sequence with each communication is called back by the image memory control circuit 15 (S103). The printer 12 is controlled by the record control circuit 13 and a list edited into a predetermined list form as in FIGS. 8A, 8B is printed out (S105). If the administration/image information list is selected (YES in S107), both the transmission and reception administration information and the image of set region are called (S109, S111). They are collated with respect to time sequence in each communication (S113), and the transmission and reception administration information and the image of set region at the same communication, which have been stored independently, are printed out as pairs of daily report information in each list as in FIGS. 9A, 9B (S115).

A manner in which they are collated with respect to time sequence in each communication will now be specifically described. The daily report memory is divided into transmission administration information, reception administration information, transmission image information and reception image information, respectively as shown in FIGS. 7A, 7B, 8A and 8B. Each divided portion is further divided as in FIGS. 7A and 7B. Each transmission/reception is assigned to administration number which is incremented with each transmission/-reception as represented in numbers in FIGS. 7A, 7B, 8A and 8B. Administration and image information for transmission and reception in one communication is stored in positions given the same administration numbers. The collation of the administration information-/image information shown in FIG. 6 is carried out using these administration numbers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile device for receiving image information transmitted from a facsimile device of a transmitting office and for reproducing said received image information, comprising:
   region setting means for setting any region of said image information to be received;
   received image storing means for storing information in a set portion of the region every time said image information is received; and
   list means for listing said image information stored in said received image storing means in the order in which they are stored in said received image storing means.

2. The facsimile device according to claim 1, further comprising:
   scan region setting means for setting any region of image information of an original to be scanned; and
   scan image storing means for storing the image information of the region set by said scan region setting means every time said image information transmitted,
   wherein said list means lists the image information stored in said scan image storing means.

3. The facsimile device according to claim 2, wherein said original includes a title portion, and wherein said scan region setting means sets said title portion of the original as said scan region.

4. The facsimile device according to claim 3, further comprising transmission administration information storing means for storing transmission administration information every time said image information is transmitted,
   wherein said list means lists said image information stored in said scan image storing means along with said transmission administration information stored in said transmission administration information storing means.

5. A facsimile device according to claim 1, wherein said storing means for storing information stores said information sequentially and,
   said lists means for listing prints said image information.

6. The facsimile device according to claim 1, wherein the region set by said region setting means is part of transmitting source information received as said image information.

7. The facsimile device according to claim 6, further comprising reception administration information storing means for storing predetermined reception administration information every time said image information is received,
   wherein said list means lists said image information stored in said received image storing means along with said reception administration storage information stored in said reception administration information storing means.

8. A facsimile device for transmitting image information obtained by scanning an original to a facsimile device of a receiving office, comprising:
   scan region setting means for setting any region of said image information to be scanned;
   scan image storing means for storing the image information of the region set by said scan region setting means every time said image information is transmitted; and
   list means for listing the image information stored in said scan image storing means in the order in which it is stored in said scan image storing means.

9. The facsimile device according to claim 8, wherein the region set by said scan region setting means includes a title portion of said original to be transmitted.

10. The facsimile device according to claim 9, further comprising transmission administration information storing means for storing transmission administration information every time said image information is transmitted,
    wherein said list means lists the image information stored in said scan image storing means along with the transmission administration information stored in said transmission administration information storing means.

11. The facsimile device according to claim 8, wherein said scan image storing means stores the image information in the order the images are transmitted and the lists means for listing prints the image information in the order in which the images are transmitted.

12. A daily report administration device of a facsimile device for preparing and storing reception administration information every time image information transmitted from a transmission facsimile device is received and for recording said reception administration information as a reception administration list, comprising:
    region setting means for setting any region of said image information to be received;
    received image storing means for storing the image information of the region set by said region setting means every time said image information is received in connection with said reception administration information; and
    list means for listing said image information stored in said received image storing means as said reception administration list along with said reception administration information.

13. The daily report administration device of the facsimile device according to claim 12; wherein said region setting means sets a region including information of a transmitting source information which transmitted said received image information.

14. The daily report administration device according to claim 12, wherein said lists means for listing prints said image stored information in the order in which the images are received with the reception information.

15. A daily report administration device of a facsimile device for preparing and storing transmission administration information every time image information obtained by scanning an original is transmitted to a reception facsimile device and for recording said transmission administration information as a transmission administration list, comprising:
    region setting means for setting any region of said image information to be scanned;
    scanned image storing means for storing the image information of the region set by said region setting means every time the image information is transmitted in connection with said transmission administration information; and
    list means for listing the image information stored in said scanned image storing means as said transmission administration list along with said transmission administration information.

16. The daily report administration device of the facsimile device according to claim 15, wherein said region setting means sets a region including a main portion of said transmitted image information.

17. The daily report administration device of the facsimile device according to claim 16, wherein said main portion includes a title of said original to be scanned.

18. The daily report administration device as claimed in claim 15, wherein the lists means for listing prints the image information with a predetermined area of the transmitted image information in the order in which the images are transmitted.

19. A daily report administration device of a facsimile device for preparing and storing communication administration information every time image information is transmitted and received and for recording and reproducing said communication administration information as a daily report administration list, comprising:

region setting means for setting any region of said image information to be transmitted and received;

image storing means for storing image information of said set region in connection with said communication administration information; and selectively listing means for selecting and listing any one out of a first mode in which said communication administration information is only recorded as a daily report administration list, a second mode in which the image information stored in said image storing means is listed as a daily report administration list along with said communication administration information, and a third mode in which the image information stored in said image storing means is listed in the order in which the image information is stored in said image storing means.

20. The daily report administration device of the facsimile device according to claim 19, wherein said region setting means sets a region including information of a transmitting source which transmitted said received image information.

21. The daily report administration device of the facsimile device according to claim 19, wherein said region setting means sets a region including a main portion of said image information to be transmitted.

* * * * *